(12) United States Patent
Kratz et al.

(10) Patent No.: US 11,312,237 B2
(45) Date of Patent: Apr. 26, 2022

(54) DISPLAY DEVICE AND MOTOR VEHICLE HAVING A DISPLAY DEVICE

(71) Applicant: Bayerische Motoren Werke Aktiengesellschaft, Munich (DE)

(72) Inventors: Thomas Kratz, Munich (DE); Stefan Lutz, Munich (DE); Zongru Yang, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/739,337

(22) Filed: Jan. 10, 2020

(65) Prior Publication Data
US 2020/0148060 A1    May 14, 2020

Related U.S. Application Data

(63) Continuation of application No. PCT/EP2018/068647, filed on Jul. 10, 2018.

(30) Foreign Application Priority Data

Jul. 13, 2017   (DE) ..................... 10 2017 212 011.8

(51) Int. Cl.
*B60K 35/00*     (2006.01)
*G06F 3/01*      (2006.01)

(52) U.S. Cl.
CPC .............. *B60K 35/00* (2013.01); *G06F 3/016* (2013.01); *B60K 2370/1434* (2019.05); *B60K 2370/152* (2019.05); *B60K 2370/158* (2019.05); *B60K 2370/693* (2019.05)

(58) Field of Classification Search
None
See application file for complete search history.

(56) References Cited

U.S. PATENT DOCUMENTS

| | | | |
|---|---|---|---|
| 2005/0080193 A1* | 4/2005 | Wouters ................. | C09J 133/04 525/191 |
| 2008/0055277 A1* | 3/2008 | Takenaka .............. | G06F 3/0488 345/177 |
| 2009/0085882 A1* | 4/2009 | Grant ...................... | G06F 1/169 345/173 |
| 2009/0195512 A1* | 8/2009 | Pettersson ............... | G06F 3/041 345/173 |

(Continued)

FOREIGN PATENT DOCUMENTS

| DE | 10 2014 019 006 A1 | 6/2016 |
|---|---|---|
| WO | WO 2014/090074 A1 | 6/2014 |

(Continued)

OTHER PUBLICATIONS

International Search Report (PCT/ISA/210) issued in PCT Application No. PCT/EP2018/068647 dated Oct. 12, 2018 with English translation (four (4) pages).

(Continued)

*Primary Examiner* — Matthew Yeung
(74) *Attorney, Agent, or Firm* — Crowell & Moring LLP

(57) ABSTRACT

A display device for representing information on a display includes at least one display module and at least one cover glass, wherein mechanical insulation is arranged between the display module and the cover glass, and at least one actuator is designed to induce a movement of the display.

8 Claims, 3 Drawing Sheets

(56) References Cited

U.S. PATENT DOCUMENTS

| | | | | |
|---|---|---|---|---|
| 2010/0090813 | A1* | 4/2010 | Je | G06F 3/016 340/407.2 |
| 2011/0276878 | A1* | 11/2011 | Sormunen | G06F 3/03547 715/702 |
| 2011/0279961 | A1* | 11/2011 | Shedletsky | G06F 3/0412 361/679.21 |
| 2013/0140965 | A1* | 6/2013 | Franklin | G06F 1/1626 312/223.1 |
| 2013/0265268 | A1 | 10/2013 | Okumura et al. | |
| 2014/0071079 | A1* | 3/2014 | Heubel | G06F 3/041 345/173 |
| 2014/0253302 | A1* | 9/2014 | Levesque | G08B 6/00 340/407.1 |
| 2020/0026357 | A1* | 1/2020 | Kirsch | G06F 3/043 |
| 2020/0301186 | A1* | 9/2020 | Nagasaki | B60K 37/02 |

FOREIGN PATENT DOCUMENTS

| | | | |
|---|---|---|---|
| WO | WO2018046302 | * | 3/2018 |
| WO | WO 2018/149988 A1 | | 8/2018 |

OTHER PUBLICATIONS

German-language Written Opinion (PCT/ISA/237) issued in PCT Application No. PCT/EP2018/068647 dated Oct. 12, 2018 (six (6) pages).

German-language Search Report issued in counterpart German Application No. 10 2017 212 011.8 dated Jun. 8, 2018 with partial English translation (12 pages).

\* cited by examiner

DISPLAY DEVICE AND MOTOR VEHICLE HAVING A DISPLAY DEVICE

CROSS REFERENCE TO RELATED APPLICATIONS

This application is a continuation of PCT International Application No. PCT/EP2018/068647, filed Jul. 10, 2018, which claims priority under 35 U.S.C. § 119 from German Patent Application No. 10 2017 212 011.8, filed Jul. 13, 2017, the entire disclosures of which are herein expressly incorporated by reference.

BACKGROUND AND SUMMARY OF THE INVENTION

The present invention relates to a visual display device for reproducing information on a display and to a motor vehicle having such a visual display device.

Nowadays displays for displaying information are generally touch-capable, that is to say that the program sequence of a technical unit, for example a computer, a tablet, a navigation unit, etc. may be controlled directly by touching parts of an image. Through haptic feedback, it is possible to transmit to an applicant the information that their input was successful. The haptic feedback may be generated at a cover glass through a controlled excitation. The excited movement is in this case transmitted from a display module to the surface of the cover glass.

In this case, the excited movement has to be conveyed via several components from the excitation source to the surface of the cover glass. A powerful actuator is required for this purpose, which is disadvantageous in terms of installation space, power supply, value and costs. In addition, movements may be transferred from the excitation source via a display carrier to the dashboard, as a result of which noise interference may be caused.

It is therefore an object of the present invention to provide a visual display device for reproducing information, which visual display device is optimized in terms of installation space and costs and furthermore generates less noise interference.

The object is achieved according to the invention by way of a visual display device for reproducing information on a display, having at least one display module and at least one cover glass, wherein a mechanical insulation is arranged between the display module and the cover glass, and having at least one actuator, which is designed to excite a movement of the display.

The cover glass and the display module are decoupled from one another by way of the mechanical insulation by virtue of a movement excited by the actuator being intercepted at the mechanical insulation. The mechanical insulation may absorb the movement energy of the excited movement and dampen said movement. The transmission of the movement excited by way of the actuator therefore ends at the mechanical insulation. This also prevents the excited movement from causing noise interference in the dashboard.

The movement excited by the actuator primarily results in a movement of the cover glass, where a user touches the display and perceives the haptic feedback. In contrast, the display module is not moved or moved only very little by the excited movement. The mechanical insulation therefore achieves a situation in which the energy density of the movements at the cover glass is as high as possible.

Due to the mechanical decoupling of the cover glass and the display module, the mass that is intended to be moved by the actuator is also kept low. This in turn leads to high excitations at an acceleration of up to 15 g with a low energy outlay being possible.

The lower the mass to be moved, the smaller the size of the actuator may be, which has a positive effect on the visual display device in many respects. On the one hand, the costs of the actuator and the required power electronics system may be reduced with respect to previous solutions. To this end, the current consumption of the actuator may be reduced and the performance thereof may be improved. Furthermore, a smaller actuator also means a lower installation space requirement. Particularly in the automotive industry, the installation space requirement plays a large role.

For example, a lateral movement of the cover glass is generated by way of the actuator. A lateral movement may be perceived by a user particularly well as haptic feedback. The movement excited by the actuator may be perceived by a user as vibration.

The mechanical insulation preferably comprises a viscous medium, in particular a low-viscosity medium. As a result, the cover glass may be mechanically decoupled from the display module, and specifically in such a way that a relative movement may occur between the display module and the cover glass.

The strength of the mechanical insulating effect may be influenced by the viscosity of the medium. Ideally, the viscosity is zero or tends toward zero. Such values may be realized, for example, with water or air.

In accordance with one embodiment, the mechanical insulation has a flexible bonding. The bonding has, for example, a gel-like consistency, or is formed as a gel. The flexible bonding consists, for example, of a low-viscosity medium and an adhesive. The adhesive preferably likewise has a low viscosity or forms, together with the low-viscosity medium, a flexible bonding with low viscosity. In accordance with one embodiment, the bonding may contain a low-molecular siloxane. In particular, the bonding may comprise a silicone or be formed as a silicone gel.

On account of the flexibility of the bonding, the cover glass may be mechanically decoupled from the display module. The flexible bonding forms, for example, a material layer, which is arranged between the cover glass and the display module and connects, in particular adhesively bonds, the two elements to one another. In this case, the bonding makes possible a relative movement between the display module and the cover glass when a movement of the display is excited by way of the actuator.

The flexible bonding preferably extends entirely over a surface area of the display module directed toward the cover glass. As a result, the bonding ensures reliable securing of the cover glass to the display module. Furthermore, the bonding may also positively influence the reflection properties of the display by virtue of it filling the air gap between the cover glass and the display module. This prevents light being refracted at the gap, as a result of which the legibility of the visual display unit is significantly improved. As a result, the visual display device may be particularly energy-efficient since less energy is required for the background lighting of the display. In addition to the improved legibility, the adhesive bonding offers further advantages: dust may not enter and the cover glass does not get condensation in a humid environment.

Furthermore, the bonding may also increase the stability of the cover glass. In particular, the bonding may prevent the cover glass from splitting, for example in the event of an accident, and thus increase the safety for a vehicle occupant.

The thickness of the flexible bonding may be between 0.1 mm and 2 mm, in particular between 0.2 mm and 1 mm.

The actuator is arranged, for example, directly on the cover glass and therefore directly on the element that is intended to be excited to move by way of the actuator. As a result, the visual display device functions very efficiently and only a small amount of movement energy is absorbed at other elements of the visual display device. For example, the actuator may be adhesively bonded to the cover glass or connected thereto in another way.

In accordance with a further embodiment, the visual display device has a plastic frame, which encloses the cover glass, wherein the actuator is arranged directly on the plastic frame. This embodiment is also very efficient since only one element, namely the plastic frame, is arranged between the actuator and the cover glass. The actuator may be adhesively bonded, screwed or secured in another way to the plastic frame. The plastic frame may have holding elements for this purpose, which have already been formed on the plastic frame during production of the plastic frame, for example by way of injection molding.

The actuator may comprise an electric motor, an electromagnetic coil and/or a piezo element. Each of these elements is suitable for making it possible to excite the display reliably.

The display module preferably has a touch display, such that a user may perform an input and may influence the visual display presented to the display by touching the visual display device, in particular the cover glass. At the point at which the user performs an input, the actuator may excite a movement of the display, which is perceived by the user as haptic feedback. As a result, it is confirmed to the user that their performed input was successful.

The visual display device may be part of an on-board computer of a motor vehicle.

The object is furthermore achieved according to the invention by way of a motor vehicle having a visual display device for reproducing information on a display. The visual display device is formed as described above.

The visual display device may be part of an on-board computer of the motor vehicle.

The visual display device is preferably integrated in the dashboard of the motor vehicle, at a position at which a user, when sitting on the driver side, may easily reach the visual display device in order to perform an input.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
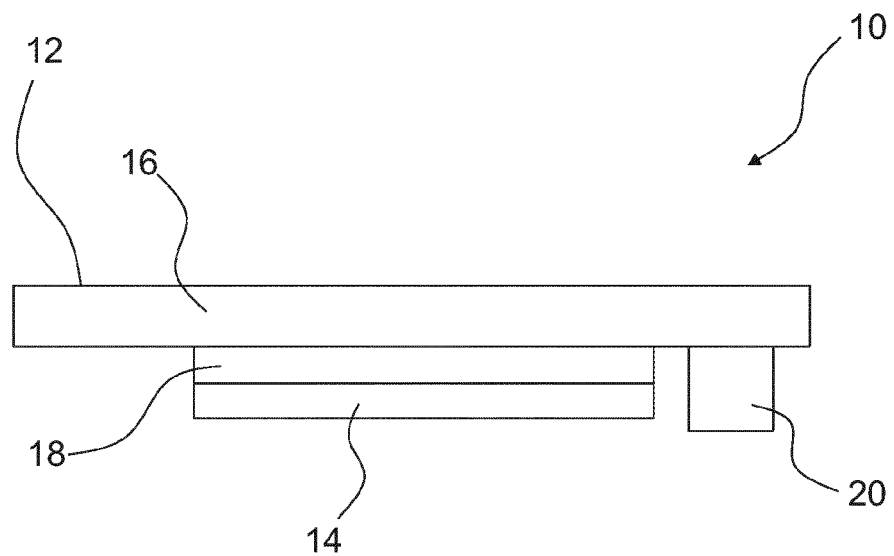
FIG. 1 shows a visual display device according to an embodiment of the invention for reproducing information on a display.

FIG. 1 schematically shows a visual display device 10 for reproducing information on a display 12. The visual display device 10 has a display module 14 and a cover glass 16, wherein the cover glass 16 has a greater surface area than the display module 14. The display module 14 may have, for example, an LCD display. The display module 14 preferably has a touch display such that a user may perform an input by touching the visual display device, which input controls the information reproduced by the visual display device 10. A touch panel may be arranged on one side of the cover glass 16 for this purpose.

A mechanical insulation 18 is arranged between the display module 14 and the cover glass 16, said mechanical insulation serving to mechanically decouple the cover glass 16 and the display module 14 from one another but at the same time to ensure securing between the two components. The mechanical insulation 18 may be formed, for example, as flexible bonding, wherein the flexibility of the bonding ensures the mechanical decoupling. In particular, the mechanical insulation may comprise a viscous medium. The bonding is preferably formed by the viscous medium. In particular, the flexible bonding may comprise an adhesive. In accordance with one exemplary embodiment, the flexible bonding comprises water and an adhesive. In particular, the flexible bonding may comprise a gel or consist of a gel.

An actuator 20 is arranged, for example fixed, on the cover glass 16. The actuator may have an electric motor, an electromagnetic coil and/or a piezo element, which are not illustrated in the figures for the sake of simplicity.

Figure 2:
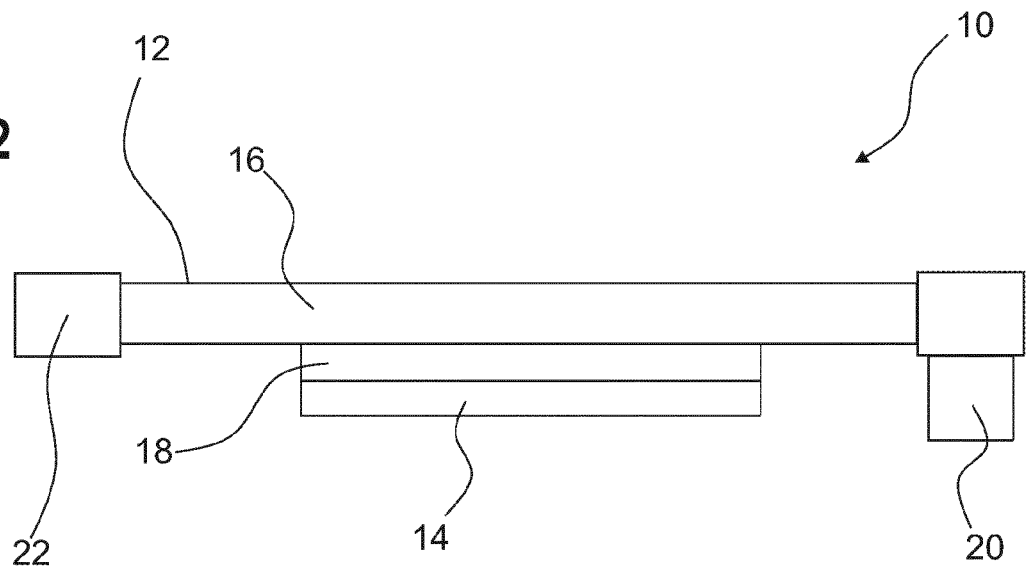
FIG. 2 shows an alternative visual display device.

In an alternative embodiment, which is illustrated in FIG. 2, a plastic frame 22 is arranged around the cover glass 16. The plastic frame 22 serves to cover the sharp edges of the cover glass 16 and also to achieve an optically appealing design.

A movement of the cover glass 16 may be excited by way of the actuator 20, for example a lateral movement. This movement may serve as haptic feedback in order to confirm to a user that a performed input was successful.

Figure 3:
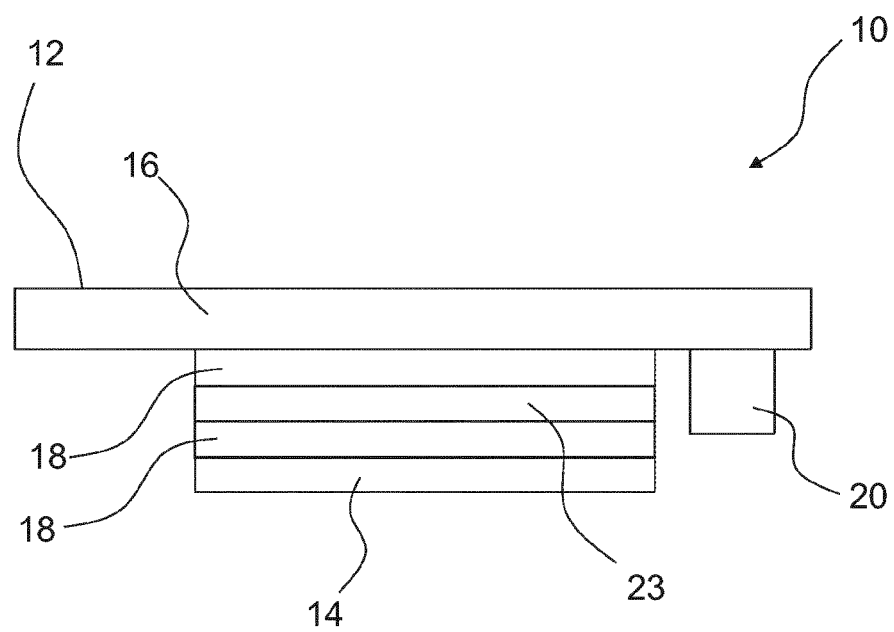
FIG. 3 shows a further alternative visual display device.

FIG. 3 shows a further embodiment of a visual display device 10. In contrast to the embodiment shown in FIG. 1, in this case a first mechanical insulation 18 is arranged between the cover glass 16 and a touch panel 23. A further identically formed mechanical insulation is arranged between the touch panel 23 and the display module 14.

Figure 4:
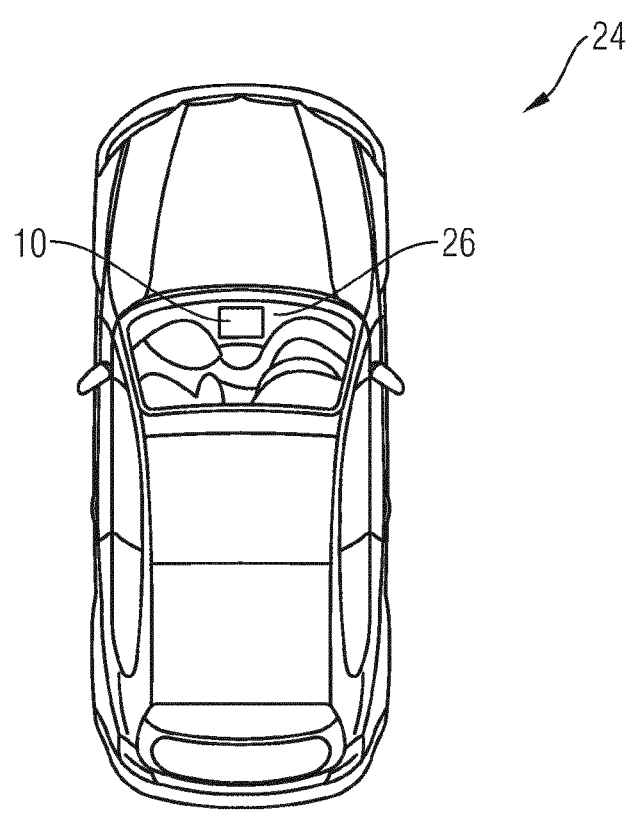
FIG. 4 shows a motor vehicle having a visual display device in accordance with FIG. 1.

FIG. 4 shows a motor vehicle 24 having a visual display device 10, which may be designed as described in FIGS. 1 to 3.

The visual display device 10 is located in the center of the dashboard 26 of the motor vehicle 24. As a result, the visual display device 10 is able to be reached easily by a user sitting on the driver side or on the passenger side.

The visual display device 10 is preferably part of an on-board computer of the motor vehicle 24, which may also have, inter alia, a navigation unit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A visual display device for reproducing information on a display, the visual display device comprising:
   at least one display module;
   at least one cover glass on which the display is shown;
   a mechanical insulation arranged between the display module and the cover glass;
   at least one actuator, which is designed to excite a movement of the cover glass, and a touch panel that is arranged between adjacent layers of the mechanical insulation; wherein:

the mechanical insulation comprises a flexible bonding that is configured such that the cover glass is mechanically decoupled from the display module, and the flexible bonding comprises an adhesive.

2. The visual display device according to claim 1, wherein the flexible bonding further comprises a viscous medium.

3. The visual display device according to claim 1, wherein the actuator is arranged directly on the cover glass.

4. The visual display device according to claim 1, further comprising:

a plastic frame that encloses the cover glass, wherein the actuator is arranged directly on the plastic frame.

5. The visual display device according to claim 1, wherein the actuator comprises one or more of an electric motor, an electromagnetic coil and a piezo element.

6. A motor vehicle comprising a visual display device according to claim 1.

7. The visual display device according to claim 1, wherein the flexible bonding extends entirely over a surface area of the display module that faces the cover glass.

8. The visual display device according to claim 1, wherein the flexible bonding fills an air gap between the display module and the cover glass.

\* \* \* \* \*